(12) United States Patent
Kumaoka (10) Patent No.: US 6,413,432 B1
(45) Date of Patent: Jul. 2, 2002

(54) METHOD FOR TREATING DRAIN WATER AND WASTE LIQUID BY THE USE OF POROUS CERAMICS PROVIDED WITH AMORPHOUS PORE SURFACES

(75) Inventor: Shun'ichi Kumaoka, Apart No. 9, Al-Khaled Building 5th Floor, Khaled Al-Zaid, No. 3 Street, Route #8, Al-Salmeyah (KW)

(73) Assignee: Shun'ichi Kumaoka, Al-Salmeyah (KW)

( * ) Notice: Subject to any disclaimer, the term of this patent is extended or adjusted under 35 U.S.C. 154(b) by 0 days.

(21) Appl. No.: 09/516,214

(22) Filed: Feb. 29, 2000

Related U.S. Application Data (62) Division of application No. 08/933,212, filed on Sep. 19, 1997, now Pat. No. 6,042,763.

(30) Foreign Application Priority Data

| Sep. 20, 1996 | (JP) | ............................................. | 8-250454 |
| Oct. 22, 1996 | (JP) | ............................................. | 8-279143 |
| Oct. 22, 1996 | (JP) | ............................................. | 8-279220 |

(51) Int. Cl.$^7$ .................................................. C02F 9/00
(52) U.S. Cl. ........................ 210/669; 210/679; 210/694; 210/502.1; 210/503; 210/903; 210/906; 210/908
(58) Field of Search ................................ 210/668, 669, 210/679, 690, 694, 908, 909, 502.1, 503, 903, 906

(56) References Cited

U.S. PATENT DOCUMENTS

| 2,242,434 A | 5/1941 | Norton | .......................... | 264/44 |
| 3,297,801 A | 1/1967 | Konrad | .......................... | 264/44 |
| 5,278,007 A | 1/1994 | Nanataki et al. | ............. | 429/247 |
| 5,795,471 A | * 8/1998 | Naito | .......................... | 210/283 |

FOREIGN PATENT DOCUMENTS

| DE | 2460641 | 10/1975 |
| JP | A58-205516 | 11/1983 |

(List continued on next page.)

OTHER PUBLICATIONS

Patent Abstracts of Japan Publication No. 61136490 published Jun. 24, 1986 (Abstract Only).

(List continued on next page.)

Primary Examiner—Ivars Cintins
(74) Attorney, Agent, or Firm—Smith, Gambrell & Russell, LLP (57) ABSTRACT

This invention relates to a method for treating various kinds of drain water and waste liquid which treatment now becomes a problem, for example, drain water and waste liquid containing hardly removable phosphorus and nitrogen, waste liquid containing organochlorine compounds such as tetrachloroethylene, etc., excretive drain water from a piggery containing organonitrogen compounds at a high level, waste liquid containing heavy metals such as lead, hexavalent chromium, cadmium and the like, drain water from dairy product plants, fishery processing plants, slaughterhouses, etc. which contains water soluble protein at a high level, drain water from pulp plants, photo developing waste liquid, car wash drain water containing a mixture of car polishing wax and detergent and the like by the use of porous ceramics provided with amorphous pore surfaces. Porous ceramics provided with amorphous pore surfaces are prepared by mixing clay, a pore forming material and water, molding into an arbitrary shape followed by drying, heating up an molded article thus dried, heating up an article temperature from normal temperature to 600 to 800° C. over a time period of 5 to 15 hours, maintaining this temperature for 3 to 7 hours and then calcinating at 1,200 to 1,500° C.

9 Claims, 6 Drawing Sheets

FOREIGN PATENT DOCUMENTS

| | | |
|---|---|---|
| JP | A60-261586 | 12/1985 |
| JP | A61-136490 | 6/1986 |
| JP | A61-291473 | 12/1986 |
| JP | B63-66247 | 12/1988 |
| JP | B1-42758 | 9/1989 |
| JP | B1-60317 | 12/1989 |
| JP | B2-1558 | 1/1990 |

OTHER PUBLICATIONS

Patent Abstracts of Japan Publication No. 07313868 published Dec. 5, 1995 (Abstract Only).

Patent Abstracts of Japan Publication No. 58205516 published Nov. 30, 1983 (Abstract Only).

Patent Abstracts of Japan Publication No. 61153196 published Jul. 11, 1986 (Abstract Only).

EP Search Report No. 97116383 dated Jan. 21, 1998 and Annex.

* cited by examiner

METHOD FOR TREATING DRAIN WATER AND WASTE LIQUID BY THE USE OF POROUS CERAMICS PROVIDED WITH AMORPHOUS PORE SURFACES

This application is a division of U.S. application Ser. No. 08/933,212 filed Sep. 19, 1997, now U.S. Pat. No. 6,042,763.

BACKGROUND OF THE INVENTION

1. Field of the Invention

The present invention relates to porous ceramics provided with amorphous pore surfaces useful for treating various kinds of drain water and waste liquid which treatment now becomes a serious problem, such as river or lake water and industrial drain water containing hard to remove phosphorus and nitrogen, waste water containing organochlorine compounds such as tetrachloroethylene, piggery excreta waste water containing organic nitrogen at high levels, waste water containing heavy metals such as lead, hexavalent chromium, nickel, mercury, zinc, cadmium, selenium, etc., drain water from dairy factories, aquatic food processing factories and slaughter houses which contains water soluble protein at high level, drain water from pulp industry, photographic developer waste water, car wash drain water containing a mixture of polishing wax and detergent and the like, and a method for preparing the same and a method for treating various kinds of drain and waste water by the use of the porous ceramics and activated carbon.

2. Description of the Related Art

Recently, one serious social problem is pollution of water areas, for example, lake eutrification caused by an excessive supply of nutritive salt such as phosphorus, nitrogen, etc. from river basins thereof, and further, an inflow of similar nutritive salt into basins, etc. due to concentration of both population and industry, which results in abnormal breeding of algae and an occurrence of red tide thereby damaging fisheries.

As a lake is a closed water basin where water remains therein long enough to easily precipitate contaminants, water pollution thereof is more serious than that of rivers and sea areas and causes difficulty in filtering tap water, problems of off-flavor or -taste and troubles of a water use in the field of fisheries, etc.

Conventional methods for treating drain water and waste liquid containing phosphorus and nitrogen are generally known as in the following. As to phosphorus, the most general is a coagulation method using a coagulant, which comprises, for example, an anaerobic-aerobic primary treatment, a coagulating secondary treatment using a coagulant and a reverse osmotic and ion exchanging final treatment. Although an absorbing or crystallizing treatment is also known, the coagulation method is often used for industrial drain water, while the anaerobic-aerobic method is used for sewage, in general. As to nitrogen, various kinds of treating methods are known such as nitrification-denitrification, ammonia stripping, selective ion exchange, break-point chlorination, catalytic oxidation and the like, although the anaerobic-aerobic treatment (nitrification-denitrification) and a combined method of the coagulation and anaerobic-aerobic treatment are practically used among others.

Tetrachloroethylene is an odorous liquid organochlorine compound having higher specific gravity and used as a solvent for laundry, metal cleaning, etc., but as is well known, exhibits adverse effects in humans and causes headache, giddiness, hepatic dysfunction and the like. Trichloroethylene is also an odorous liquid organochlorine compound having higher specific gravity and mainly used as a metal cleaning solvent because of adequate compatibility thereof with oil, but as is well known, causes headache, giddiness, hepatic dysfunction and the like.

In a conventional method for generally treating waste liquid and drain water containing organochlorine compounds such as tetrachloroethylene, trichloroethylene, these toxic substances were recovered by means of an activated carbon unit or a moisture separating unit as a pretreatment to reduce concentration thereof in the waste liquid and drain water, followed by an aeration treatment.

Heretofore, it has been known to treat various kinds of waste water by the use of porous ceramics.

JP-A No. 58-205,516, for example, describes a superior tubular cartridge-type ceramic filter for selectively removing chemicals, heavy metals, etc. in which a silicastone-clay mixture is added with feldspar and alumina powder, kneaded with saw dust and water to form a muddy molded article and calcined at a temperature of 1,100 to 1,200° C.

JP-B No. 1-60,317 describes a waste water treating system for sewage, etc. which comprises a filter layer consisting of sand and gravel layers formed on the bottom of a treating tank, a treating layer formed by laminating porous ceramic particles on the filter layer and air diffuser tubes arranged between an upper surface of the treating layer and a bottom surface of the filter layer.

JP-A No. 61-136,490 describes an aeration-type waste water treating system in which filter materials comprising porous ceramic particles filled in a perforated material such as a net are vertically arranged at certain spaces on a location so as to cross the direction of a waste water flow in an aeration tank.

JP-B No. 1-42,758 describes an advanced aeration-type waste water treating system which comprises an aeration tank in which filter materials comprising porous ceramic particles filled in a perforated material such as a net are vertically arranged at certain spaces on a location so as to cross the direction of a waste water flow in the aeration tank, a filter layer connected with the aeration tank through a tube body and consisting of sand and gravel layers on a bottom portion thereof, a treating layer formed by laminating porous ceramic particle on the filter layer and diffuser tubes arranged between an upper surface of the treating layer and a bottom surface of the filter layer.

JP-B No. 2-1,558 describes a method for biologically treating waste water such as domestic, general industrial or food processing waste water in the main in a treating medium containing porous ceramics and wood chips as main components.

JP-B No. 63-66,247 describes a method for treating emulsifiable oil containing waste water in which a mixture of porous ceramics and activated carbon is filled as a filter material in a cylindrical body to use as a filter system.

JP-A No. 60-261,586 describes a method for removing metals, metal ions and organochlorine compounds in drinking water such as tap water by means of a filter system with an intermediate layer of activated carbon between porous ceramics layers.

Further, as a method for preparing porous ceramics useful for the treating the above mentioned drain and waste water, JP-A-No. 61-291,473 describes a method for preparing porous ceramics by compounding a pore forming material to a slurry of clay mineral material added by and mixed with water followed by drying and calcination, characterized in that the pore forming material is subjected to a pretreatment to combine a metal powder or organometalic compound to a pore surface, while the calcination is conducted in an atmosphere of air or nitrogen.

DISCLOSURE OF THE INVENTION

However, when the above mentioned methods or conventionally known porous ceramics are used to treat various kinds of drain water and waste water containing, for example, phosphorus, nitrogen and organochlorine compounds such as tetrachloroethylene and trichloroethane which treatment is now becoming a problem, it has been impossible to completely remove these toxic contaminants therefrom.

In addition, according to an example described in JP-A No. 61-291,473 as mentioned above, a dry molded product is heated up and calcined at a temperature of about 1,200 to 1,500° C. for an hour to form porous ceramics. The thus formed ceramics are generally homogeneous in quality because of such heating up to 1,200 to 1,500° C. in rather a short period of time by means of an electric kiln and calcination for an hour or so, which does not change a pore surface thereof to amorphous but results in scattering compressive strength. As ceramics of less compressive strength are easily pulverized, clogging of drain water or waste water treating columns occurs when these ceramics are filled therein, which makes it difficult to use such columns longer, while they exhibit not enough ability to remove toxic contaminants nor long-term durability when they are used to treat various kinds of drain water and waste water. That is, such ceramics can not be used practically.

The present inventors have studied to develop practical and long-term durable ceramics which can remove toxic contaminants such as phosphorous (P); nitrogen (N); organochlorine compounds, e.g., tetrachloroethylene, etc.; and heavy metals, e.g., hexavalent chromium, lead, etc. from drain water and waste water containing these contaminants to a level lower than the Japanese environmental water quality standard or to a level of almost zero. While reviewing in detail conventional information relating to porous ceramics from a viewpoint completely different from existing knowledge in how to prepare homogeneous porous ceramics has been studied, porous ceramics provided with amorphous pore surfaces were prepared, and it was unexpectedly found that the thus prepared porous ceramics are effective and practical for treating various kinds of drain and waste water. Thus, the present invention has been accomplished.

The present invention relates to a method for preparing porous ceramics provided with amorphous pore surfaces and a method for treating drain water and waste liquid containing phosphorus, nitrogen, organochlorine compounds such as tetrachloroethylene, etc. by the use of same. Further, the present invention relates to a method for preparing porous ceramics provided with amorphous pore surfaces by mixing clay, a pore forming material and water, molding into an adequate shape, followed by drying, heating up the temperature of molded articles thus dried from ordinary temperature to 600 to 800° C. over a time period of 5 to 15 hours, desirably 10 hours or so by, for example, self-burning of the pore forming material mixed in the articles, then maintaining temperature thereof at 600 to 800° C. for 3 to 7 hours, desirably for about 5 hours, consecutively heating up to 1,200 to 1,500° C., calcining the molded articles at the heated up temperature for 4 to 8 hours, desirably for about 6 hours, and subjecting a crushing treatment after cooled off, and a method for treating drain water and waste liquid containing phosphorus, nitrogen, organochlorine compounds such as tetrachloroethylene, etc. by the use of same.

In addition, the present invention relates to a method for treating drain water or waste water containing phosphorus, nitrogen, organochlorine compounds, etc. by the use of a mixture of porous ceramics provided with amorphous pore surfaces and activated carbon, desirably the mixture comprising the same weight of such components.

Further, the present invention relates to a method for treating drain water and waste liquid containing phosphorus and nitrogen in which the drain water and waste liquid is introduced to a top opened storage-open type aeration tank containing a mixture of porous ceramics provided with amorphous pore surfaces and activated carbon, subjected to aeration from the bottom of the tank and then passed through a column filled with the mixture of porous ceramics with amorphous pore surfaces and activated carbon, a coagulation treatment using a coagulant being used together with either of above mentioned steps, if necessary.

Furthermore, the present invention relates to a treating system for drain water and waste liquid containing phosphorus and nitrogen in which a coagulation-precipitation tank arranged therein at need, a top opened and bottom aerating storage-open type aeration tank containing porous ceramics provided with amorphous pore surfaces and activated carbon and a column filled with a treating agent containing porous ceramics provided with amorphous pore surfaces are arranged.

The present invention also relates to a method for treating drain water and waste liquid containing tetrachloroethylene, Trichloroethylene, trichloroethane, dichloromethane, carbon tetrachloride and the like, and a method for treating drain water and waste liquid containing organochlorine compounds such as dry cleaning waste liquid, etc.

The present invention also relates to a method for treating waste liquid and drain water containing organochlorine compounds in which the waste liquid and drain water containing organochlorine compounds is passed through and treated in a column filled with a treating agent containing a mixture of porous ceramics provided with amorphous pore surfaces and activated carbon, desirably the mixture comprising each component at a mixing ratio by weight of 50 to 50.

The present invention also relates to a treating system for waste liquid and drain water containing organochlorine compounds which comprises a column filled with a treating agent containing porous ceramics provided with amorphous pore surfaces, desirably a mixture thereof with activated carbon mixed at an equal weight ratio, and a means to pass the waste liquid and drain water containing organochlorine compounds to the column.

The present invention will be further described in detail in the following.

Clay used to prepare porous ceramics provided with amorphous pore surfaces of the present invention includes clay mineral which is adhesive and plastic in quality when water is added, hardened when dried and contains silicate mineral as a main component thereof and, if necessary, may further contain inorganic components such as calcium, magnesium, sodium, potassium and the like.

A pore forming material used to prepare porous ceramics provided with amorphous surface of the present invention includes any material originated from a plant sawdust, wood chips, chaff, straw, wheat bran, bark and the like which generates gas when the material is heated, plastic dust, particulate absorbent high polymer, sodium carbonate and the like. Sawdust and wood chips are desirably used because these materials form porous ceramic structure with amorphous pore surfaces without radical generation of gas at a self burning step thereof.

Tap water is generally used to prepare porous ceramics provided with amorphous pore surfaces generally includes tap water, while sea water may also used as "water" when the clay mineral contains less alkaline components. If clay or a pore forming material as the starting material contains water, such water may be used as moisture.

In a method for preparing porous ceramics provided with amorphous surface of the present invention, kneading of clay, a pore forming material and water may be carried out to homogenize them in arbitrary order by means of a kneading machine such as a mortal cement mixer, etc. Although any mixing ratio of these materials may be used if porous ceramics provided with amorphous surface of the present invention can be obtained, a mixture of 2 parts by weight of clay, 3.2 parts by weight of water and 6.76 parts by weight of the pore forming material is desirably, but unrestrictedly used so that many amorphous areas are formed on continuous pore portions to absorb substances to be treated on residual unsmooth portions.

The thus kneaded materials are then molded into an arbitrary shape convenient for calcination, such as a brick shape, a disk shape and so on.

In a method for preparing porous ceramics provided with amorphous surface of the present invention, drying of the thus molded product is usually but unrestrictedly conducted by leaving the product intact at room temperature to attain a water content of 40%, and may also be carried out through blowing by means of a burner, etc.

In a method for preparing porous ceramics provided with amorphous surface of the present invention, heat-up and calcination may be conducted by any kind of means which can heat up and calcine the molded articles as described above after drying, such as an electric kiln, a ceramics kiln made of fire bricks and the other type of kiln, these kilns being desirably used from a viewpoint of mass production of uniform ceramics at a time.

In a method for preparing porous ceramics provided with amorphous surface of the present invention, the molded articles after calcination may be directly used as filter media of a block type and a cartridge type, while such articles are usually subjected to a crushing treatment when they are used to fill a column, etc. Although any type of roller crushers may be used to conduct the crushing treatment, it is desirable to use a roller crusher improved by the present inventors to leave the narrowest space of 10 to 30 mm between rollers so as to reduce the formation of powdery ceramics unsuitable to use for a column, etc.

In the following, there will be detailed the most important processes of heat-up and calcination in a method for preparing porous ceramics provided with amorphous surface of the present invention.

First of all, temperature of molded and dried articles is gradually heated up from normal temperature to 600 to 800° C. and desirably to 800° C. An adoption of such a slow heat-up process allows properties of sintered ceramics to maintain about the same form as that of a molded point of time, thereby forming sufficient continuous pores and yielding reaction sites for substances to be treated.

On the other hand, sintered ceramics might be brittle because of an insufficient linkage between crystalline components, when a rapid heat-up process is adopted by means of an electric kiln, etc. according to a conventional method in which the slow heat-up is not used, such as, for example, described in a method for preparing porous ceramics of the above mentioned JP-A No. 61-291,473. At the same time, most of the pore surfaces formed on the ceramics are covered with crystalline components to increase passing resistance of components to be treated through the pores, thereby yielding ceramics in which the components to be treated permeate insufficiently into the pores. When such ceramics are used to remove contaminants and toxic components in drain water and waste liquid, removal thereof proceeds unsatisfactorily, while it is impossible to obtain long term durable ceramics.

A time period required to conduct the above mentioned slow heat-up process from normal temperature to 600 to 800° C. usually ranges 5 to 10 hours and is desirably about 10 hours, depending on a size and an amount of the molded articles. While the heat-up process can be controlled by adjusting temperature of an electric kiln and a ceramics kiln or the other type of kiln to be heated or warmed, it is especially desirable to burn a corner of the molded and dried articles by means of, for example, a burner when the pore forming material is a burnable material such as sawdust, the heat-up process being conducted by burning of the burnable pore forming material per se, i.e., self burning.

The method for controlling temperature of the molded articles due to self burning has been epochally found by the present inventors on the way to prepare the porous ceramics and, as a result, it is confirmed that the above mentioned method can provide porous ceramics provided with amorphous surface useful for treating drain water and waste liquid containing phosphorus, nitrogen, organochlorine compounds and the like.

As has been described above, the burnable material such as sawdust, etc. in the molded articles is ashed at a stage when temperature of the molded and dried articles heated up to 600 to 800° C. over a time period of 5 to 15 hours. At this stage, the temperature ranging from 600 to 800° C. is kept by additional burning for 3 to 7 hours, desirably for about 5 hours. This process is essential for preparing porous ceramics provided with amorphous surface of the present invention.

An adoption of this process allows alkaline components in clay to melt out gradually, thereby changing continuous pore surfaces of porous ceramics to amorphous and improving strength of sintered porous ceramics. When conventional heat-up is conducted rapidly from normal temperature to 1,200 to 1,500° C. without adopting the above mentioned process, quality of sintered ceramics varies widely and in addition, ability thereof to remove toxic components and contaminants becomes insufficient.

While compressive strength of thus prepared ceramics varies widely, for example, ceramics of lower compressive strength are powdered during a crushing process after calcination thereof, which easily cause clogging because of considerable fluid resistance and, as a result, can not be practically used when such powdery ceramics are filled in a column to treat drain water and waste liquid.

The molded articles heated to 600 to 800° C. for 3 to 7 hours are then heated up to 1,200 to 1,500° C. over a time period of about 4 hours.

Due to such a relatively wider range of calcination temperature from 1,200 to 1,500° C. in the present invention, amounts of silicon dioxide and alkaline components in clay are controlled to result in difference in active surfaces as a result of calcination. The calcination temperature is about 1,200° C. when an alkaline content in the clay is relatively rich and calcination is conducted easily, while the temperature is 1,500° C. when a silicon dioxide content in the clay is rich and calcination is conducted hardly. Accordingly, calcination temperature of about 1,250° C. is especially preferable to obtain ceramics to be used for various purposes.

When temperature of the molded articles goes up to 1,200 to 1,500° C. calcination is conducted at this temperature for 4 to 8 hours, desirably for about 6 hours. If a time period of calcination at this temperature is only an hour or so as described in JP-A No. 61-291,473, brittleness is a typical disadvantage of ceramics thus obtained, because surfaces of continuous pore forming portions is insufficiently changed to an amorphous state, thereby yielding less sintering strength with surrounding particles.

The term "amorphous pore surface" used herein means that surfaces of continuous pores formed inside of ceramics comprise a combination of an amorphous material containing sodium silicate as a main component and a crystalline material (crystalline particles) such as sodium silicate, calcium oxide etc. The crystalline portion (crystalline particles) reacts with components to be treated in waste water, while the amorphous portion makes little contribution to the reaction.

Figure 1:
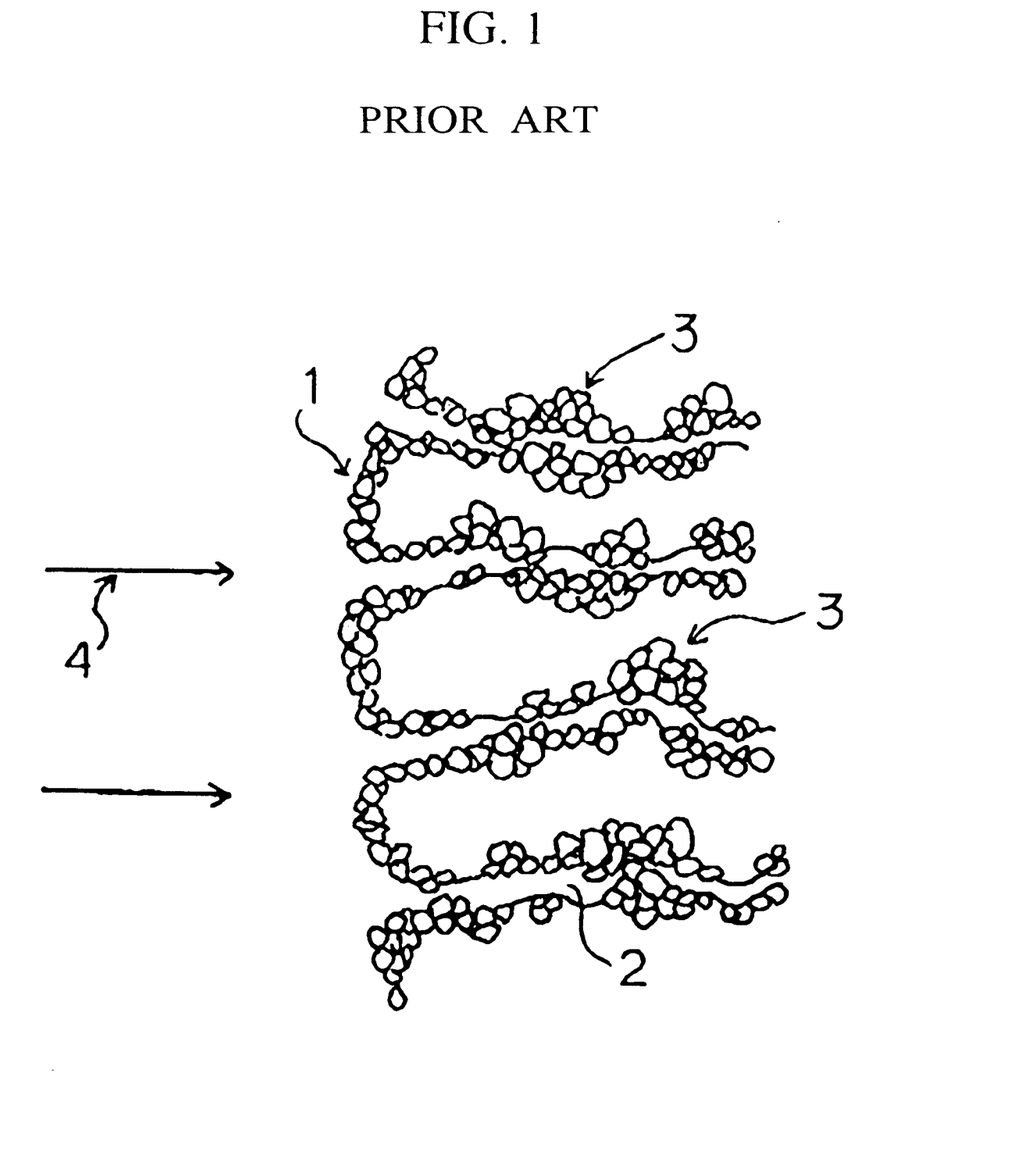
FIG. 1 is a diagrammatic illustration of a pore surface condition of conventional porous ceramics.
Figure 2:
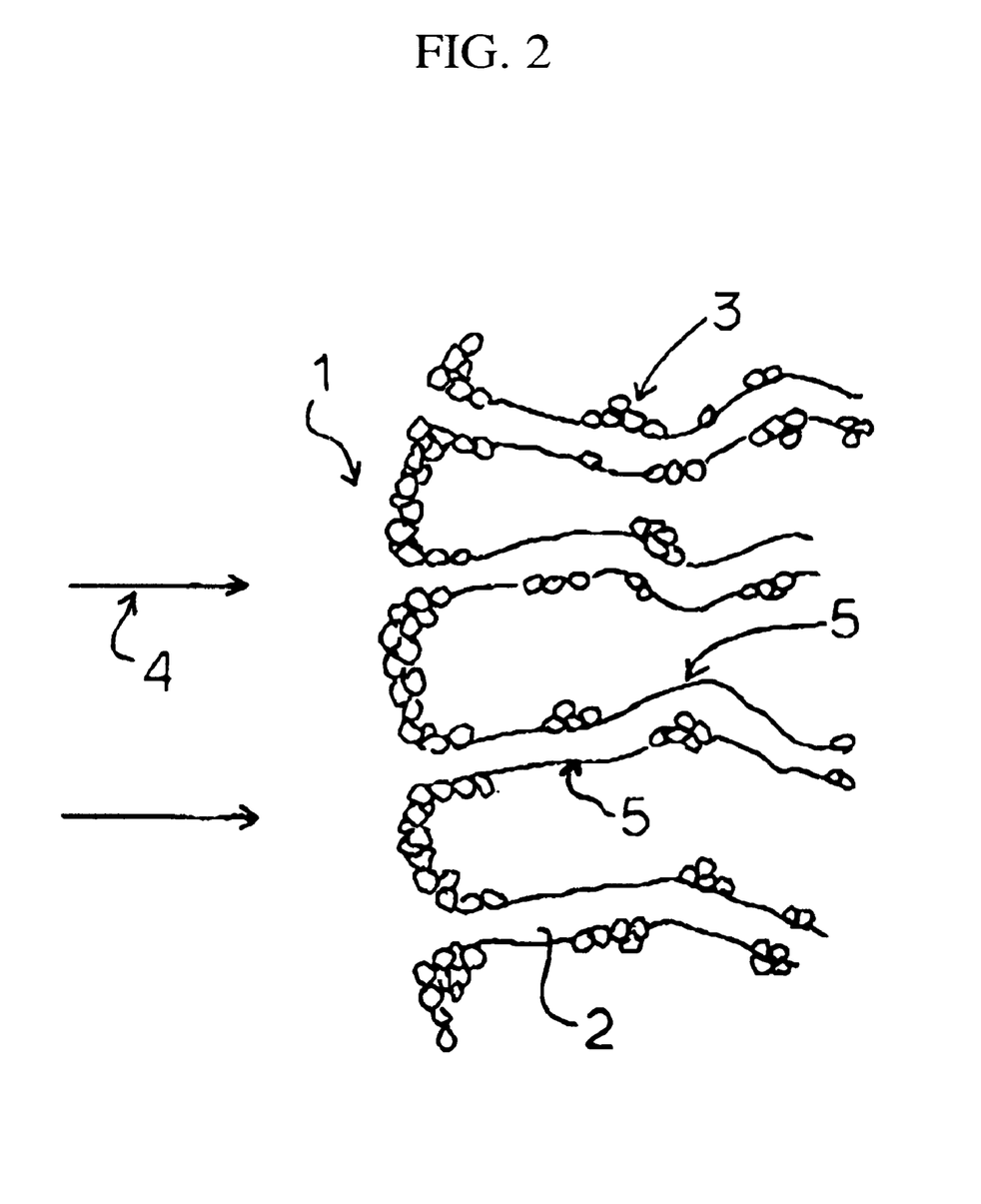
FIG. 2 is a diagrammatic illustration of porous ceramics provided with amorphous pore surfaces of the present invention.

As a result of electron microscopy of continuous pore surfaces using HITACHI emission-type electron microscope S-4200 model under a condition of accelerating voltage of 10 KV (secondary electronic image) and 20 KV (reflective electronic image) and a magnification of 3,000, it is observed that not only ceramic particle surfaces 1 but most of surfaces of continuous pores 2 of conventional ceramics such as, for example, porous ceramics described in JP-A No. 61-291,473 are covered by crystalline particles 3 as shown in FIG. 1. Even when a flow 4 of components to be treated reaches the ceramic particles and is ready to pass through the continuous pores 2, these components can not easily enter into or permeate through the pores 2 because of resistance of the ceramics. Almost exclusively, the ceramic article surfaces 1 make contribution to the reaction with components to be treated in this case. By contrast, as shown in FIG. 2, there exist flat and amorphous portions 5 on surfaces of continuous pores 2 of porous ceramics provided with amorphous surface of the present invention. When a flow 4 of components to be treated reaches the ceramic particles and passes through the continuous pores 2, these components can easily enter into or permeate through the pores 2 with less resistance of the ceramics. Accordingly, not only the ceramic particle surfaces 1 but the crystalline particles 3 in the pores 2 reacts with the components to be treated, thereby considerably improving a treating effect of drain water and waste liquid containing phosphorus and nitrogen.

Activated carbon used in the present invention includes any product prepared by thoroughly carbonizing a raw material such as charcoal, coconut shell and coal-char as well as animal bones, blood and the like, and is not limited to a certain commercially available product if the material is carbonaceous and has large relative surface area and high absorbing ability.

A coagulant used in the present invention includes any agent which is not limited especially but can coagulate fine suspending contents of drain water to form flocs, while, for example, an inorganic coagulant such as iron trichloride, ammonium sulfate, calcium hydroxide, etc., and an organic high-molecular coagulant comprising a surfactant or a high molecular coagulant may be simultaneously used.

A storage-open type aeration tank used in the present invention includes any conventional open type aeration tank and, for example, a top opened cylindrical tank of 50 cm in diameter and 60 cm in height in which an air introducing pipe is connected to the bottom thereof, while air introduced in the pipe by a compressor or a blower is homogeneously dispersed through a porous panel or a diffuser arranged on the bottom of the tank to perform aeration. Liquid to be treated is stored in the tank during such aeration.

Columns used in the present invention includes any conventional column used for an absorption treatment and, for example, a column system in which three columns are arranged vertically and connected in series. A column arrangement may be varied arbitrarily so far as effects of the present invention are obtained, and accordingly such columns may be aligned in an inclined condition, connected in series to form a long type or arranged in parallel. Liquid is desirably passed through the columns in the direction from bottom to upward.

It is confirmed that porous ceramics provided with amorphous pore surfaces of the present invention is useful for treating various kinds of drain water and waste liquid which treatment now becomes a problem, for example, drain water and waste liquid containing hardly removable phosphorus and nitrogen, waste liquid containing organochlorine compounds such as tetrachloroethylene, etc., excretive drain water from a piggery containing organonitrogen compounds at a high level, waste liquid containing heavy metals such as lead, hexavalent chromium, nickel, mercury, zinc, cadmium, selenium and the like, drain water from dairy product plants, fishery processing plants, slaughterhouses, etc. which contains water soluble protein at a height level, drain water from pulp plants, photo developing waste liquid, car wash drain water containing car polishing wax and detergent and the like.

The above mentioned drain water and waste liquid containing phosphorus and nitrogen includes drain water from rivers and lakes and drain water and waste liquid from various kinds of plants such as food industry including, for example, dairy product, fishery product, fermented food product, etc.; cattle industry; pulp and textile industry; printing industry; various chemical industries; petroleum refining industry; glass and sodium industry; steel industry; metal and mechanical surface treatment industry, etc.; as well as sanitary sewage from reclaimed sites of incombustible material and drain water from hospitals, laundries, laboratories and the like.

The above mentioned drain water and waste liquid containing organochlorine compounds such as tetrachloroethylene, trichloroethylene, dichloromethane, carbon tetrachloride, 1,2-dichloroethylene, 1,1-dichloroethylene, cis-1,2-dichloroethylene, 1,1,1-trichloroethane, 1,1,2-trichloroethane, 1,3-dichloropropene and the like includes, other than drain water from laundries including dry cleaning, waste liquid and drain water containing organochlorine compounds from chemical industry, metal product manufacturing industry, electrical appliance manufacturing industry, transportation equipment manufacturing industry, precision equipment manufacturing industry, textile industry and the like.

DESCRIPTION OF THE PREFERRED EMBODIMENT

The present invention will be detailed in the following examples, however it should be understood that the present invention is not restricted by the examples. Each part used in the examples refers to part by weight.

As already noted, FIG. 1 is a diagrammatic illustration of the pore surface condition of conventional porous ceramics, while FIG. 2 is a diagrammatic illustration of the porous ceramics provided with amorphous pore surfaces according to the claimed invention.

EXAMPLE 1
Preparation of Porous Ceramics Provides with Amorphous Pore Surfaces Two parts of clay available from Seto Area in Japan, 3.2 parts of water and 6.76 parts of sawdust were thoroughly mixed and kneaded by means of a kneader, which were molded into a brick-like shape of 250 mm in length×130 mm in width×110 mm in height and dried at normal temperature for three nights to obtain a moisture content of 40%. The brick-like molded article thus dried was put in a ceramic kiln of 10 m$^3$ in capacity and burned at a corner. After about 10 hours passed, sawdust contained in the molded article was burned off and ashed by self burning to heat up temperature of about 800° C. The ashed article heated to about 800° C. was kept at an article temperature of about 800° C. for 5 hours or so by additional heating.

The molded article was then heated to a temperature of about 1,250° C. over a time period of about 4 hours and calcined at this temperature for 6 hours. The molded article thus calcined was cooled and then taken out of the kiln.

Compressive strength of the molded article at this point of time was determined by a SHIMAZU's compressive strength tester, which showed a higher range of 6.0 to 9.5 Kg/cm$^2$. The molded article was then subjected to a crushing treatment to yield 20%, 30%, 20% and 30% of variously sized particles having more than 10 mm 6 to 10 mm, 2 to 6 mm and less than 2 in diameter, respectively.

Physical properties of porous ceramics obtained in Example 1 are as in the following:

| | |
|---|---|
| bulk gravity | 0.36 to 0.40 |
| porosity | 86.7% |
| relative surface area | 23 m$^2$/g |

Composition of the above mentioned porous ceramics was determined by a KEVEX's energy dispersion X-ray spectroscope SIGMA 2 Model under a condition of accelerating voltage of 15 KV and a testing time of 100 seconds. As a result, it was found that the ceramics as a whole comprise silicon oxide, aluminum oxide, iron oxide, calcium oxide, magnesium oxide, potassium oxide, sodium oxide and the like, while composition of active portions of particle surfaces and pore surfaces comprises crystalline components such as sodium silicate, calcium silicate, calcium oxide, magnesium oxide and the like, on the other hand, that of inactive portions of pore surfaces comprises amorphous components such as sodium silicate, silicon oxide, aluminum oxide, potassium oxide, sodium oxide and the like.

Further, porous ceramics of the present invention comprise more silicic components as composition of pore surfaces compared with compositions of the ceramics as a whole and outer surfaces thereof, while an electron micrographical observation of surface condition of the present porous ceramics showed amorphous pore surfaces.

Comparative Example 1
Preparation of Conventional Porous Ceramics

A procedure of Example 1 was repeated except that a heat-up and calcination process was used as described below. A molded and dried brick-like article, which was prepared in a similar manner as described in Example 1, was put in an electric kiln and almost directly heated up to an article temperature of 1,250° C. for 4 hours and calcined at this temperature for about an hour.

Compressive strength of the molded article was determined by a SHIMAZU's compressive strength tester similarly as described in Example 1. Compressive strength thereof varied in a relatively wide range of 2.1 to 9.6 Kg/cm$^2$, in which lower compressive strength was predominant. The molded article was then subjected to a crushing treatment to yield 5%, 10%, 20% and 65% of variously sized particles having more than 10 mm, 6 to 10 mm, 2 to 6 mm and less than 2 in diameter, respectively. Comparing with Example 1, a considerably higher share of powdery ceramics was shown.

Physical properties of porous ceramics obtained in Comparative Example 1 are as in the following:

| | |
|---|---|
| bulk gravity | 0.4 to 0.52 |
| porosity | 85.6 to 87.1% |
| relative surface area | 18 to 38 m2/g |

Composition of the above mentioned porous ceramics was determined in a similar manner as described in Example 1. As a result, a practical difference was not found in composition of the ceramics as a whole, composition of active portions of particle surfaces and pore surfaces and composition of inactive portions of pore surfaces.

So far as comparison of physical properties of Example 1 and Comparative Example 1, there was no difference in composition as a whole and that of outer surfaces. However, electron micrographical observation of a condition of pore surfaces showed that, unlike porous ceramics provided with amorphous pore surfaces of the present invention, these pore surfaces comprise mainly homogeneous crystalline components such as silicon oxide, calcium oxide, etc., and that each crystalline particle is relatively large and linkage between crystalline particles is insufficient, thereby hardly resulting in structure in which a reasonable amount of active crystalline particles are distributed similarly as the ceramics of Example 1.

EXAMPLE 2

Figure 3:
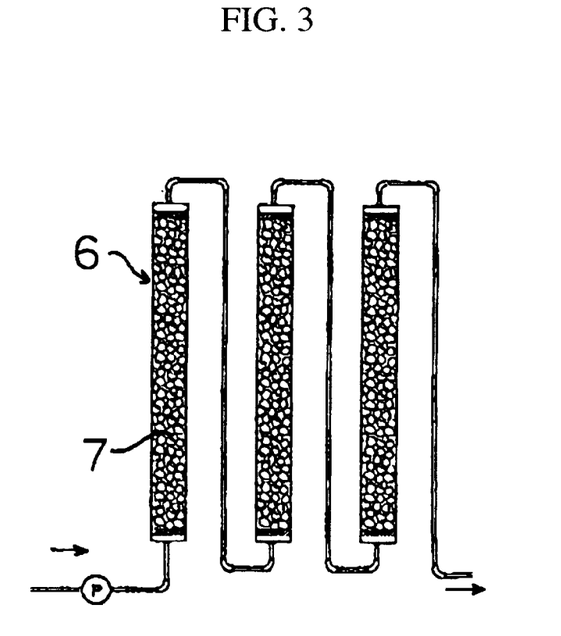
FIG. 3 is a vertical sectional view of a system of the present invention used for treating waste liquid containing organochlorine compounds.

Treatment of Waste Liquid Containing Compounds by the Use of Porous Ceramics Provided with Amorphous Pore Surfaces of the Present Invention Using a 50:50 mixture of porous ceramics provided with amorphous pore surfaces of 6 to 10 mm in diameter, which was obtained in Example 1, and activated carbon available from Takeda Chemical Co., ltd., 10 liter of plant waste liquid containing tetrachloroethylene was treated by the use of a treating system shown in FIG. 3 as in the following.

Using a treating system as shown in FIG. 3 in which columns 6 of 26 mm in diameter, 103 mm in length and 50 ml in volume were filled with a mixture 7 of porous ceramics provided with amorphous pore surfaces of Example 1 and activated carbon in an amount of 12.5 g each and three of these columns were connected in series, a long term continuous run was conducted for 14,400 minutes (100 days) of water supplying time under a treating condition of water supplying linear velocity of 0.2 mm/sec, contacting time of 25 minutes and 45 seconds and volume of treating water of 6.7 ml/min. The result is shown in FIG. 4.

Figure 4:
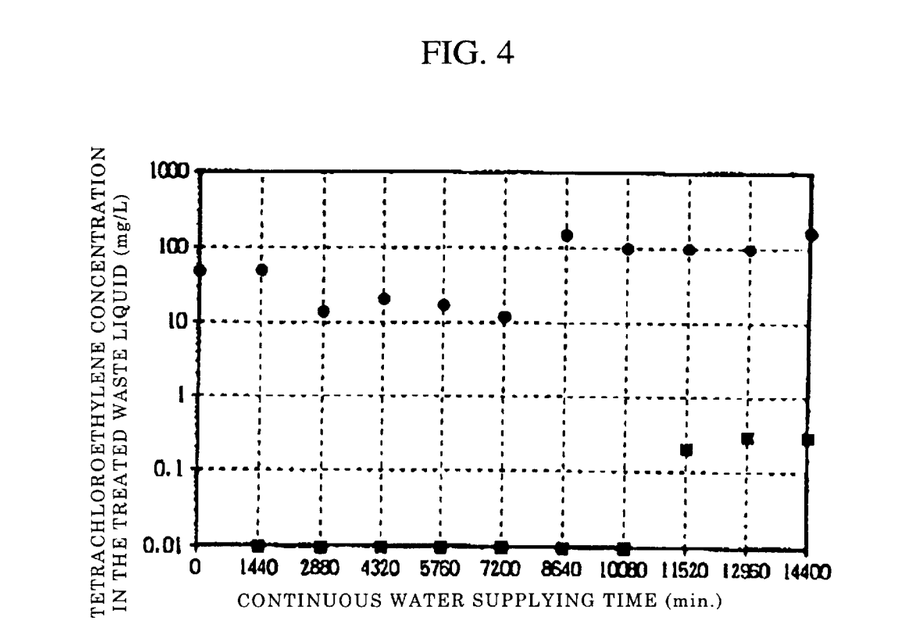
FIG. 4 is a chart which shows results of a long term continuous treatment of waste liquid containing tetrachloroethylene according to the present invention.

In FIG. 4, a mark ● indicates concentration of tetrachloroethylene in the waste liquid flown out of a plant, which varies depending on samples used.

On the other hand, a mark ■ indicates concentration of tetrachloro-ethylene in the treated waste liquid. As is apparent from FIG. 4, the concentration of tetrachloroethylene in the waste liquid treated by porous ceramics provided with amorphous pore surfaces of the present invention was decreased to 0.01 mg/lit, i.e., a level of considerably lower than the water quality standard in Japan. It was confirmed that such a remarkable treating ability of 0.01 mg/lit was kept till a continuous water supplying time of 10,680 minutes. This result is not enough clear to explain a function of porous ceramics provided with amorphous pore surfaces of the present invention as a simple phenomenon of physical absorption. Further, it is anticipated that tetrachloroethylene is decomposed through a certain action, although the mechanism thereof is not clear, while no multiplication of microorganisms is observed in the columns.

Comparative Example 2

Figure 5:
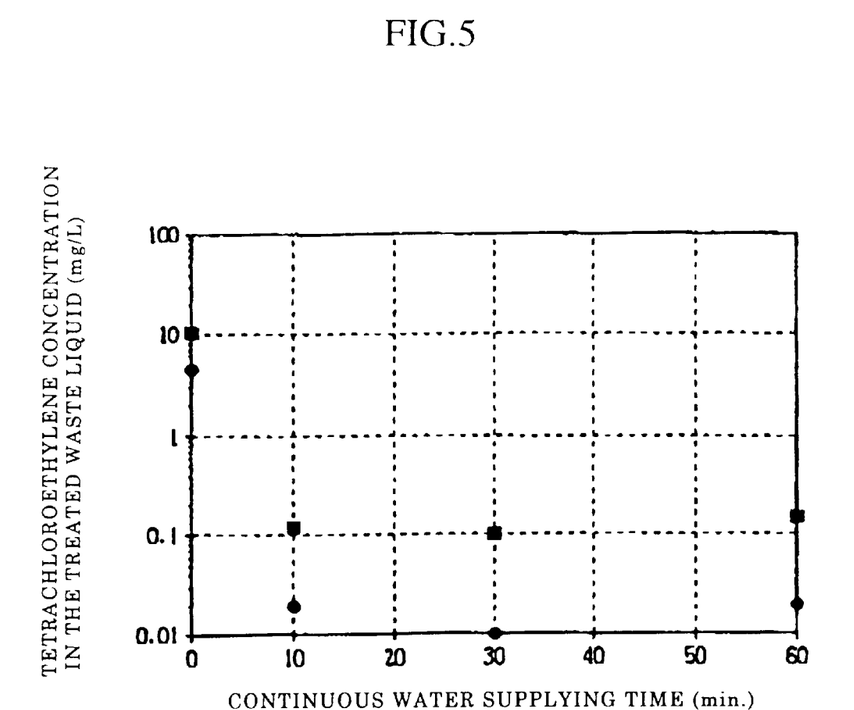
FIG. 5 is a chart which shows comparative results of a treatment of waste liquid containing tetrachloroethylene according to the present invention and a treatment of the same waste liquid by single use of activated carbon.

Treatment of Waste Liquid Containing Organochlorine Compounds by Single Use of Activated Carbon A treating process was conducted in a similar manner as described in Example 2 except only activated carbon was used instead of a mixture of porous ceramics provided with amorphous pore surfaces and activated carbon. The result obtained is shown in FIG. 5. In FIG. 5, a mark ● indicates concentration of tetrachloroethylene after the treatment was carried out by the use of the mixture of porous ceramics provided with amorphous pore surfaces and activated carbon, and on the other hand, a mark ■ indicates concentration of tetrachloroethylene when only activated carbon was used. As is apparent from FIG. 5, the concentration of tetrachloroethylene was slightly decreased to 0.1 mg/lit, which corresponded to ten times of the concentration attained by porous ceramics provided with amorphous pore surfaces in Example 2. This clearly demonstrates effectiveness of porous ceramics provided with amorphous pore surfaces of the present invention.

Comparative Example 3

Treatment of Waste Liquid Containing Organochlorine Compounds by the Use of Conventional Porous Ceramics A treatment process was conducted in a similar manner as described in Example 2 except using porous ceramics prepared according to Comparative Example 1. As a result, conventional porous ceramics showed lesser absorbing ability of tetrachloroethylene and shorter long-term durability compared with porous ceramics provided with amorphous pore surfaces of the present invention.

EXAMPLE 3

Treatment of Original Permeant Sewage from Reclaimed Sites of Incombustible Garbage Containing Phosphorus and Nitrogen by the Use of Porous Ceramics Provided with Amorphous Pore Surfaces of the Present Invention (Part 1)

Figure 6:
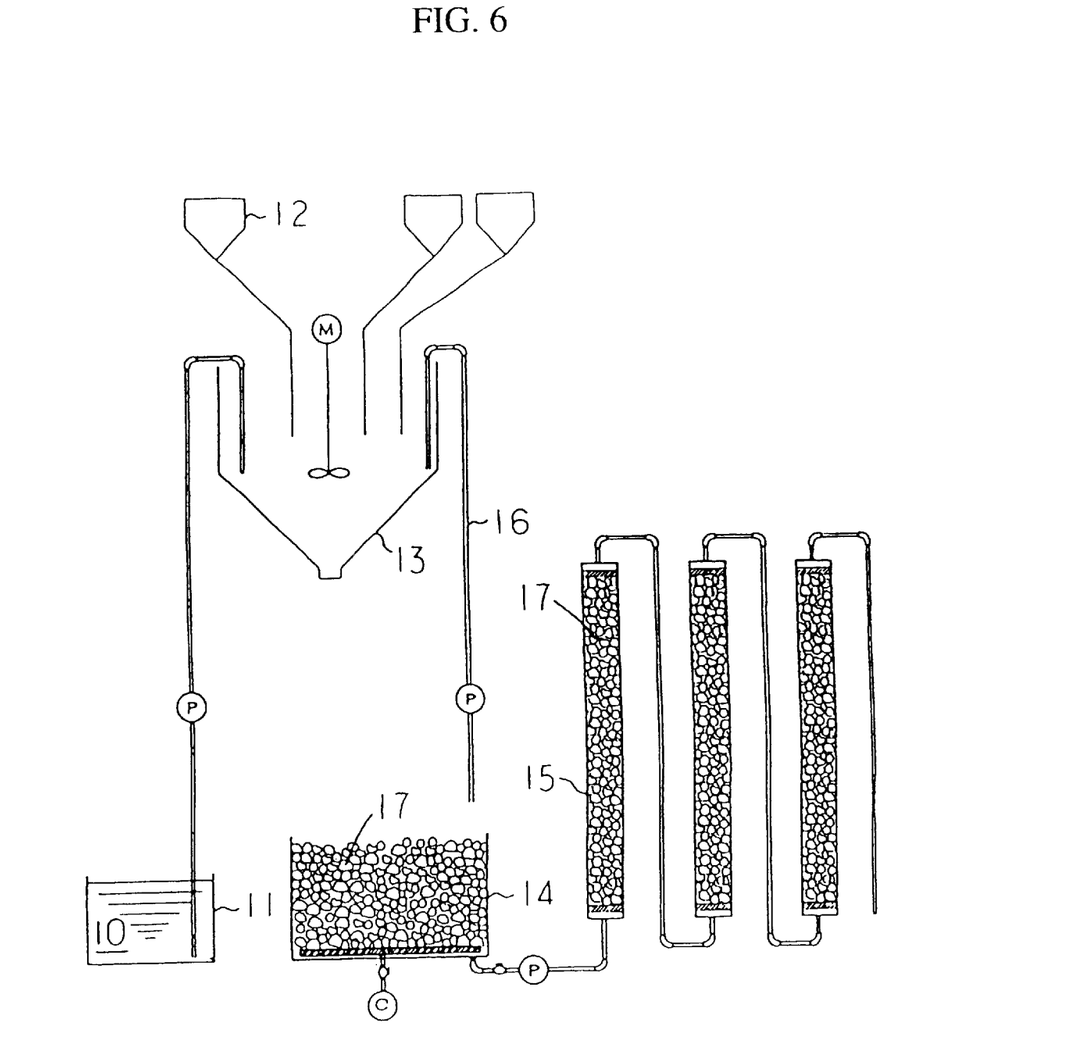
FIG. 6 is a vertical sectional view of a system of the present invention used for treating drain water and waste liquid containing phosphorus and nitrogen.

Using a 50:50 mixture of porous ceramics provided with amorphous pore surfaces of 6 to 10 mm in diameter, obtained by Example 1, and activated carbon available from Takeda Chemical Co., Ltd., permeant sewage from reclaimed sites of incombustible garbage containing phosphorus and nitrogen was treated by passing through a treating system shown in FIG. 6. The original permeant sewage smelled was slightly pale yellowish brown liquid of pH 7.5 with smell. The treating system shown in FIG. 6 comprises a storage tank 11 for storing original permeant sewage as liquid 10 containing phosphorus and nitrogen, a coagulation-precipitation tank 13 provided with coagulant tanks 12 on an upper portion thereof and stirring mechanism driven by a motor M, etc., a storage-open type aeration tank 14 in which an upper portion thereof is opened upward and aeration is conducted on the bottom by means of a compressor C, three columns 15 (26 mm in diameter, 103 mm in height and 50 ml in volume, respectively) vertically arranged and connected each other in series, connecting pipes 16 and a pump P as a driver for pumping the liquid. The 50:50 mixture 17 of porous ceramics provided with amorphous pore surfaces and activated carbon is charged in the storage-open type aeration tank 14 and the three columns 15 connected each other in series.

First of all, the original permeant sewage 10 from reclaimed sites of incombustible garbage was introduced from the storage tank 11 for the liquid to be treated to the coagulation-precipitation tank 13 by means of the pump P. A 45% solution of iron trichloride (Fe $Cl_3$) was supplied from one of the coagulant tanks 12 to the coagulation-precipitation tank 13 and thoroughly stirred to adjust the pH value to lower than 3, and then a 10% turbid solution of calcium hydroxide ($Ca(OH)_2$) was supplied thereto from the second coagulant tank 12 and thoroughly stirred to adjust the pH value to 7. Then, a 0.05% solution of a coagulant available from Sankyo Kasei Co., Ltd. as "Sanpori A-715" was supplied from the third coagulant tank 12 and thoroughly stirred to adjust concentration thereof to 0.5 to 1.0%, followed by coagulation and precipitation of suspending particles as flocs. After the coagulating and precipitating treatment, supernatant liquid had almost no smell and was completely clear.

The supernatant liquid in the coagulation-precipitation tank 13 was introduced to the storage-open type aeration tank 14 by means of pump P and subjected to an aeration treatment for 3 hours while storing therein, which was then passed successively through the three columns 15 connected to each other in series at a flow rate of 6 cm per minute from the bottom to upward to complete the treatment.

As to the original permeant sewage (sample A) and final liquid treated by passing through the three columns 15 connected to each other in series (sample C), chemical oxygen demand (COD), ammonia nitrogen $NH_4$—N), nitrous nitrogen ($NO_2$—N), nitric nitrogen ($NO_3$—N), nitrogen determined by Kjeldahl method (Kjeldahl N) and total nitrogen (TOTAL-N) thereof were determined by testing methods according to Japanese Industrial Standard (JIS) K 0102 (plant drain water testing method) 17, 42.3, 43.1, 24.1 44.3 and 45.1. As to intermediate liquid aerated for 3 hours in the storage-open type aeration tank 14 (B), total nitrogen (TOTAL-N) and total phosphorus (TOTAL-P) as a standard in the treatment process was determined by testing methods according to JIS K 0102 45.2 and 46.3. The result is shown in Table 1 below.

TABLE 1

| Sample | COD | NH$_4$—N | NO$_2$—N | NO$_3$—N | Kjeldahl N | Total N | Total P |
|--------|-----|----------|----------|----------|------------|---------|---------|
| A | 79 | 110 | 0.09 | 14 | 130 | 140 | — |
| B | — | — | — | — | — | 65 | 0.97 |
| C | 2 | 75 | 0.19 | 0.66 | 76 | 77 | — |

According to a method for treating by the use of porous ceramics provided with amorphous pore surfaces, it is clear from Table 1 that concentration of phosphorus and nitrogen is decreased to 16 mg/lit and 120 mg/lit (daily average 8 mg/lit and 60 mg/lit), respectively. As almost all phosphorus components were removed by the aeration treatment for 3 hours in the storage-open type aeration tank 14, determination of total phosphorus in the sample C was omitted. It is anticipated that an increase in nitrous nitrogen in the sample C is due from conversion from ammonia nitrogen.

EXAMPLE 4

Treatment of Original Permeant Sewage from Reclaimed Sites of Incombustible Garbage Containing Phosphorus and Nitrogen by the Use of Porous Ceramics Provided with Amorphous Pore Surfaces of the Present Invention (Part 2)

A treatment process was conducted in a similar manner described in Example 3 except a coagulation-precipitation treatment was repeated after an aeration treatment in the storage-open type aeration tank 14. The original permeant sewage 10 from reclaimed sites of incombustible garbage was introduced from the storage tank 11 for the liquid to be treated to the coagulation-precipitation tank 13 by means of the pump P. A 45% solution of iron trichloride (Fe Cl$_3$) was supplied from one of the coagulant tanks 12 to the coagulation-precipitation tank 13 and thoroughly stirred to adjust the pH value lower than 3, and then a 10% turbid solution of calcium hydroxide (Ca(OH)$_2$) was supplied thereto from the second coagulant tank 12 and thoroughly stirred to adjust the pH value to 7. Then, a 0.05% solution of a coagulant available from Sankyo Ksei Co., Ltd. as "Sanpori A-715" was supplied from the third coagulant tank 12 and thoroughly stirred to adjust concentration thereof to 0.5 to 1.0%, followed by coagulation and precipitation of suspending particles as flocs. The supernatant liquid in the coagulation-precipitation tank 13 was introduced to the storage-open type aeration tank 14 by means of pump P and subjected to an aeration treatment for 3 hours while storing therein, which was recycled to the storage-open type aeration tank 13 again to repeat the coagulation-precipitation treatment. After removal of the thus coagulated and precipitated components, supernatant liquid was passed successively through the three columns 15 connected each other in series at a flow rate of 6 cm per minute from the bottom to upward to complete the treatment.

As to the original permeant sewage (sample A) and final liquid treated by passing through the three columns 15 connected each other in series (sample E), chemical oxygen demand (COD), ammonia nitrogen NH$_4$—N), nitrous nitrogen (NO$_2$—N), nitric nitrogen (NO$_3$—N), nitrogen determined by Kjeldahl method (Kjeldahl N) and total nitrogen (TOTAL-N) thereof were determined by testing methods according to Japanese Industrial Standard (JIS) K 0102 (plant drain water testing method) 17, 42.3, 43.1, 24.1 44.3 and 45.1. As to supernatant liquid subjected to the second coagulation-precipitation treatment (B), total nitrogen (TOTAL-N) and total phosphorus (TOTAL-P) as a standard in the treatment process was determined by testing methods according to JIS K 0102 45.2 and 46.3. The result is shown in Table 2 below.

TABLE 2

| Sample | COD | NH$_4$—N | NO$_2$—N | NO$_3$—N | Kjeldahl N | Total N | Total P |
|--------|-----|----------|----------|----------|------------|---------|---------|
| A | 79 | 110 | 0.09 | 14 | 130 | 140 | — |
| D | — | — | — | — | — | 88 | <0.05 |
| E | 1 | 39 | 0.27 | 0.44 | 42 | 43 | — |

It is clear from Table 2 that the total nitrogen concentration is further decreased by repeating the coagulation—precipitation treatment and the concentration of phosphorus and nitrogen after the treatment is far lower than the general drain water standard level in Japan, i.e., 16 mg/lit and 120 mg/lit (daily average 8 mg/lit and 60 mg/lit), respectively. Almost all phosphorus components are removed and the total phosphorus level decreases to 0.005 mg or less, unexpectedly.

EXAMPLE 5

Figure 7:
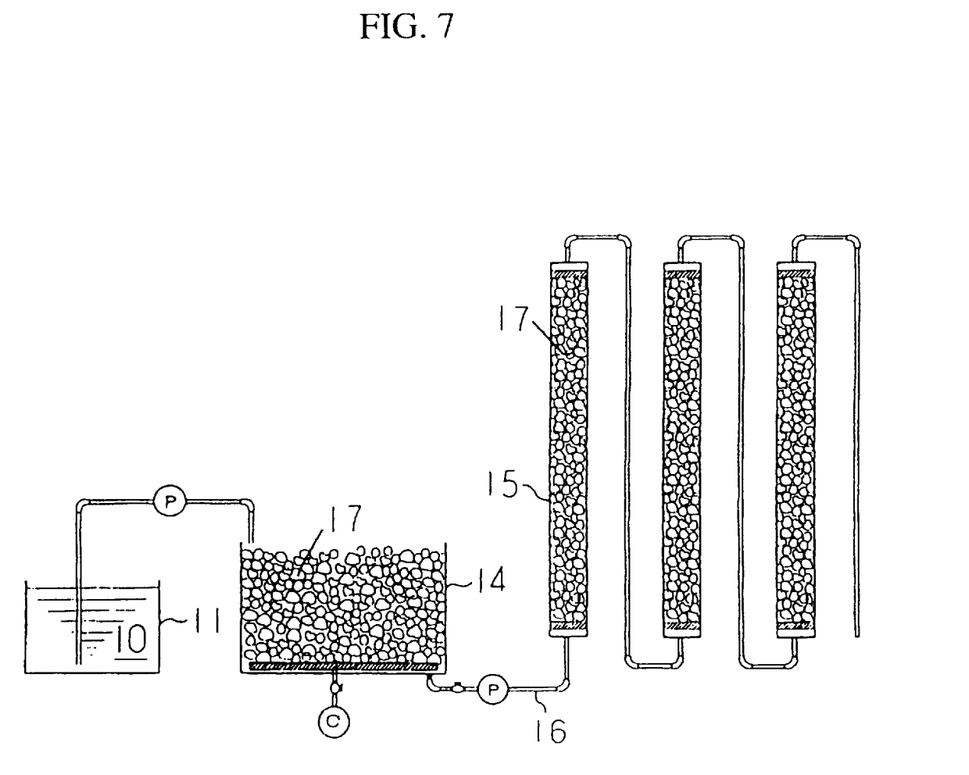
FIG. 7 is a vertical sectional view of another system of the present invention used for treating drain water and waste liquid containing phosphorus and nitrogen.

Treatment of Drain Water and Waste Liquid Containing Low Level Nitrogen by the Use of Porous Ceramics Provided with Amorphous Pore Surfaces As similarly as Example 3, a 50:50 mixture of porous ceramics provided with amorphous pore surfaces of 6 to 10 mm in diameter, obtained by Example 1, and activated carbon available from Takeda Chemical Co., Ltd., as well as the treating system shown in FIG. 7 were used. In order to demonstrate improved removing ability of porous ceramics provided with amorphous pore surfaces of the present invention, a 10 times diluted solution of permeant sewage from reclaimed sites of incombustible garbage as low level nitrogen containing liquid to be treated.

The treating system shown in FIG. 7 comprises a storage tank 11 for storing the 10 times diluted solution of permeant sewage as liquid 10 containing phosphorus and nitrogen, a storage-open type aeration tank 14 in which an upper portion thereof is opened upward and aeration is conducted on the bottom by means of a compressor C, three columns 15 (26 mm in diameter, 103 mm in height and 50 ml in volume, respectively) vertically arranged and connected to each other in series, connecting pipes 16 and a pump P as a driver for pumping the liquid. The coagulant tanks 12 and the coagulation-precipitation tank 13 of Example 3 or 4 are not used. The 50:50 mixture 17 of porous ceramics provided with amorphous pore surfaces and activateded carbon is charged in the storage-open type aeration tank 14 and the three columns 15 connected to each other in series.

The ten times diluted solution of permeant sewage 10 from reclaimed sites of incombustible garbage was introduced to the storage-open type aeration tank 14 by means of the pump P. The ten times diluted permeant sewage was subjected to an aeration treatment for 5 hours while storing therein, which was then passed successively through the three columns 15 connected to each other in series at a flow rate of 6 cm per minute from the bottom to upward to complete the treatment.

As to the ten times diluted permeant sewage (sample F), storage liquid subjected to the aeration treatment for 3 hours in the storage-open type aeration tank 14 (sample G), another storage liquid subjected to the aeration treatment for 5 hours in the storage-open type aeration tank 14 (sample H) and final liquid treated by passing through the three columns 15 connected each other in series (sample I), chemical oxygen demand (COD), ammonia nitrogen NH4—N), nitrous nitrogen (NO2—N), nitric nitrogen (NO3—N), nitrogen determined by Kjeldahl method (Kjeldahl N) and total nitrogen (TOTAL-N) thereof were determined by testing methods according to Japanese Industrial Standard (JIS) K 0102 (plant drain water testing method). COD was determined with respect to samples F and I, only. The result is shown in Table 3 below.

TABLE 3

| Sample | COD | $NH_4$—N | $NO_2$—N | $NO_3$—N | Kjeldahl N | Total N |
|---|---|---|---|---|---|---|
| F | 55 | 1.4 | 0.03 | 4.5 | 9.2 | 14 |
| G | — | 1.4 | 0.11 | 1.3 | 2.1 | 3.5 |
| H | — | 0.71 | 0.11 | 1.0 | 1.8 | 2.9 |
| I | 1 | <0.2 | 0.39 | 0.59 | 0.71 | 1.7 |

Table 3 shows that the total nitrogen of such a low level of 14 mg/lit is further decreased to 1.7 mg/lit, although it has been conventionally considered impossible to remove low level nitrogen of 50 mg/lit or lower. Further, it has also been impossible to remove nitrous nitrogen and nitric nitrogen. In the case of activated sludge, ammonia nitrogen is easily converted to nitric acid and nitrous acid under an acidic condition, and thus treatment thereof is now conducted very carefully not to induce such a reaction. In cases of Examples 3, 4 and 5, however, it is apparent that all nitrogen compounds can be treated.

Comparative Example 4
Treatment of Waste Liquid Containing Phosphorus and Nitrogen by Single Use of Activated Carbon A treating process was conducted in a similar manner as described in Example 3 except that only activated carbon was used instead of the mixture of porous ceramics provided with amorphous pore surfaces and activated carbon. As a result, both of phosphorus and nitrogen were scarcely removed.

Comparative Example 5
Treatment of Waste Liquid Containing Phosphorus and Nitrogen by the Use of Conventional Porous Ceramics A treatment process was conducted in a similar manner as described in Example 3 except that porous ceramics prepared by Comparative Example 1. A result of treatment using a mixture of the porous ceramics of Comparative Example 1 and activated carbon was about the same as that of above mentioned Comparative Example 4 in which only activated carbon was used. Neither phosphorus nor nitrogen was scarcely removed. It is apparent that the thus mixture used herein is far more inferior to the mixture of porous ceramics provided with amorphous pore surfaces of the present invention and activated carbon.

Industrial Applicability

When porous ceramics provided with amorphous pore surfaces of the present invention is used, toxic substances and contaminants in drain water and waste liquid which are now a problem can be removed and decomposed, and removing and decomposing action thereof is maintained for a practical length of time.

What is claimed is:

1. A method of treating aqueous liquid containing at least one toxic contaminant, said liquid being selected from the group consisting of drain water and waste liquid, the method comprising passing the liquid through a column containing a mixture of:

a treating agent comprising a porous ceramic having amorphous pore surfaces and a compressive strength of from 6 to 8 kg/cm², and activated carbon.

2. The method according to claim 1, wherein the at least one toxic contaminant comprises at least one of phosphorus and nitrogen.

3. The method according to claim 1, wherein the at least one toxic contaminant comprises at least one organochlorine compound.

4. The method according to claim 1, wherein the porous ceramic is prepared by a process comprising:

mixing clay, water and a pore-forming material to form a mixture;

molding the mixture to form a molded article;

drying the molded article;

heating the molded article over a period of from 5 to 15 hours to a temperature of from 600 to 800° C., thereby burning the pore-forming material;

maintaining the molded article at a temperature of from 600 to 800° C. for from 3 to 7 hours; and calcinating the molded article at a temperature of from 1,200 to 1,500° C. to form a porous ceramic having amorphous pore surfaces.

5. The method according to claim 4, wherein the at least one toxic contaminant comprises at least one of phosphorus and nitrogen.

6. The method according to claim 4, wherein the at least one toxic contaminant comprises at least one organochlorine compound.

7. The method according to claim 1, further comprising a preliminary step of passing the liquid through an open tank provided with a means of aeration, the open tank containing a porous ceramic having amorphous pore surfaces and a compressive strength of from 6 to 8 $kg/cm^2$.

8. The method according to claim 7, wherein the at least one toxic contaminant comprises at least one of phosphorus and nitrogen.

9. The method according to claim 7, wherein the at least one toxic contaminant comprises at least one organochlorine compound.

* * * * *